United States Patent [19]

Chmielewski et al.

[11] Patent Number: 5,384,045

[45] Date of Patent: Jan. 24, 1995

[54] FILTER CLEANER

[76] Inventors: Jerry Chmielewski; Doreen M. Chmielewski, both of 7224 N. Hale, Tampa, Fla. 33614

[21] Appl. No.: 242,952

[22] Filed: May 16, 1994

[51] Int. Cl.$^6$ .......................... B08B 3/02; B08B 9/00; B01D 29/68; B01D 29/74

[52] U.S. Cl. ..................................... 210/354; 210/169; 210/409; 210/411; 134/53; 134/54; 134/55; 134/138; 134/152; 134/170; 211/163

[58] Field of Search ............ 210/407, 411, 412, 416.2, 210/169, 497.01, 354, 408, 409; 211/163; 134/152, 170, 153, 22.1, 171, 200, 138, 51, 53, 54, 55

[56] References Cited

U.S. PATENT DOCUMENTS

| | | |
|---|---|---|
| 2,178,701 | 11/1939 | Petre . |
| 3,073,325 | 1/1963 | Rebizzo . |
| 3,216,429 | 11/1965 | Dick . |
| 3,236,249 | 2/1966 | Everroad . |
| 3,442,273 | 5/1969 | Hanish . |
| 3,538,926 | 11/1970 | Nesbitt . |
| 3,606,897 | 9/1971 | Tobin . |
| 3,608,567 | 9/1971 | Neill . |
| 3,650,283 | 3/1972 | Lang . |
| 3,688,780 | 9/1972 | Everroad . |
| 3,693,406 | 9/1972 | Tobin . |
| 3,765,051 | 10/1973 | Wanat . |
| 3,820,552 | 6/1974 | Lang . |
| 4,261,822 | 4/1981 | Richardson . |
| 4,299,245 | 11/1981 | Clapper . |
| 4,417,596 | 11/1983 | Pahlen . |
| 4,655,910 | 4/1987 | Tabor . |
| 4,668,384 | 5/1987 | Holman . |
| 5,038,809 | 8/1991 | Rodgers . |
| 5,263,503 | 11/1993 | St. Jean . |
| 5,292,074 | 3/1994 | Clark . |
| 5,330,065 | 7/1994 | Bradley . |

FOREIGN PATENT DOCUMENTS

| | | |
|---|---|---|
| 26270 | 4/1981 | European Pat. Off. . |
| 1322890 | 2/1962 | France . |
| 2460699 | 3/1981 | France . |
| 2519566 | 1/1982 | France . |
| 1188559 | 3/1965 | Germany . |
| 62-171726 | 7/1987 | Japan . |
| 63-44918 | 2/1988 | Japan . |
| 889044 | 12/1981 | U.S.S.R. . |
| 1065024 | 1/1984 | U.S.S.R. . |
| 834976 | 12/1984 | U.S.S.R. . |
| 1194465 | 11/1985 | U.S.S.R. . |
| 1230639 | 5/1986 | U.S.S.R. . |

Primary Examiner—Thomas M. Lithgow
Attorney, Agent, or Firm—David Kiewit

[57] ABSTRACT

A dirty swimming pool filter is journaled for rotation about a vertical array of nozzles and spun about a vertical axis by the action of the spray. The rotation can be fast enough that centrifugal forces aid in the cleaning operation by sloughing dirt off the outside of the filter. One version of the apparatus includes a second vertical array of nozzles external to the filter and directing a spray against the outer face of the filter, which aids in sloughing dirt off it. This second array is rotatable about its own vertical axis and can be used to control the rate of rotation of the filter being cleaned. A sealed bearing is provided at the base of the filter to allow free rotation about the first vertical array of nozzles.

12 Claims, 4 Drawing Sheets

FILTER CLEANER

BACKGROUND OF THE INVENTION

Many swimming pools have a pump that recirculates the water through pleated paper filter cartridges. These filters commonly consist of a parallel array of cylindrical elements with two open ends. The filter elements are periodically removed from the filter housing, manually cleaned (e.g., by immersion in a chlorine-containing solution, spraying with a garden hose, or brushing), and visually inspected to see if they are worn to the point of requiring replacement.

Some swimming pools have sand filters that are cleaned in situ by backwashing. In situ cleaning is commonly practiced in non-swimming pool filtration applications in which the filtered medium is something other than water (in which case ex situ open washing of the filter with clean filtered medium could be expensive and, in many cases, would spill contaminants), or in which the filter system is very large. Numerous inventors have provided apparatus and methods in this area. Notable among these teachings are:

U.S. Pat. No. 3,674,151, wherein Freeland discloses a filter screen backflushed by a set of cleaning nozzles. A corresponding set of conduits on the upstream side of the filter rotate with the nozzles and carry away whatever dirt is washed off the screen.

U.S. Pat. No. 4,271,018, wherein Drori teaches a filter that is rotated so that the entire surface can be backwashed with a fixed nozzle.

U.S. Pat. No. 4,923,600, wherein Krofta teaches backwashing a filter by rinsing its downstream side with an array of nozzles that move relative to the filter medium. Krofta also uses a rotating brush to clean the upstream side of the filter.

U.S. Pat. No. 4,941,971, wherein Albright teaches apparatus for in situ cleaning of a swimming pool filter rotatably mounted in a container. In one embodiment, Albright provides a moving nozzle directed at the upstream side of the filter. This nozzle spins the filter fast enough that centrifugal force helps to flush contaminants off its outer surface.

U.S. Pat. No. 5,108,592, wherein Wilkins et al., describe a set of backflushing nozzles inside a cylindrical filter screen and directed at the upstream side of the screen. Wilkins' screen is journaled onto a shaft and is rotated by the stream of cleaning fluid.

U.S. Pat. No. 5,228,993, wherein Drori discloses several approaches to cleaning a composite filter comprising a stack of annular disk filters. Drori's apparatus includes an array of backwash nozzles located along the axis of the generally cylindrical composite filter. These nozzles rotate about the vertical axis, and are translated axially by an external hand-crank or motor.

SUMMARY OF THE INVENTION

Simple, inexpensive apparatus for ex-situ cleaning of a swimming pool filter includes a vertical array of spray nozzles. The filter to be cleaned is journaled for rotation about the array of nozzles and spun about a vertical axis by the action of the spray. The rotation can be fast enough that centrifugal forces aid in the cleaning operation by sloughing dirt off the outside of the filter. The speed of rotation is controlled by setting the orientations of various of the nozzles. For example, if one has a nozzle array that spins the filter too fast, one can rotate one of the nozzles about a horizontal axis so that it provides a braking spray—i.e., so that sprays from several (e.g., two) nozzles act to rotate the filter in one sense, while a spray or sprays from a smaller number of nozzles (e.g., one nozzle) opposes this rotation.

In the preferred embodiment of the invention, a second vertical array of nozzles is provided external to the filter element to be cleaned. This array directs a spray against the upstream face of the filter and aids in sloughing dirt off that side of the filter cartridge. The external and internal arrays of nozzles are used together to control the rate of rotation of the cartridge being cleaned.

It is an object of the invention to provide filter backwashing apparatus in which a filter is rotated about an axial array of nozzles by a tangentially sprayed cleaning solution and in which the speed of rotation is controlled by orienting one or more of the nozzles in an opposing direction so their spray(s) act(s) to brake the rotation induced by the spray from other nozzles.

It is an additional object of the invention to provide apparatus for cleaning a cylindrical filter element by simultaneously washing the downstream side of the filter with a first array of spray nozzles generally disposed near the axis of the filter while washing the upstream side of the filter with a second array of spray nozzles that is fed from a common supply and located external to the filter cartridge. The washing process includes using a tangential spray component from one or more nozzles to rotate the filter about its axis while it is sprayed.

DETAILED DESCRIPTION

Filters commonly used in swimming pool filtration systems may be made of pleated sheets of paper formed into a cylinder that is open at both ends. Elastomeric annular disks at the ends act to retain the paper filtration material and to provide sealing surfaces. Filters that are of particular concern for the cleaning apparatus of the invention have a total surface area of five to ten square meters, an outer diameter of ten to fifteen centimeters, and a length somewhat less than one half meter. Specific examples of these known elements included the Model C500 made by the Hayward Corporation, and the Model SR70 made by the Sta-Rite Corporation.

The filters mentioned above are normally used inside a metal filter housing, from which they must be periodically removed for cleaning and inspection. When in service, the flow of recirculating water is from the outside to the inside of the element—i.e., the upstream side of the filter, on which dirt, or filtrate, collects, is commonly the outside of the open ended cylinder. Manually backwashing such a filter would require removing it from the filter housing (i.e., an ex situ washing process), and spraying it with a hose nozzle held inside the filter. The diameters of commonly employed filters are too small to permit an operator to put his or her hand and a spray nozzle inside the cartridge, so manual washing of these filters is usually restricted to using a spray on the upstream side thereof.

Figure 1:
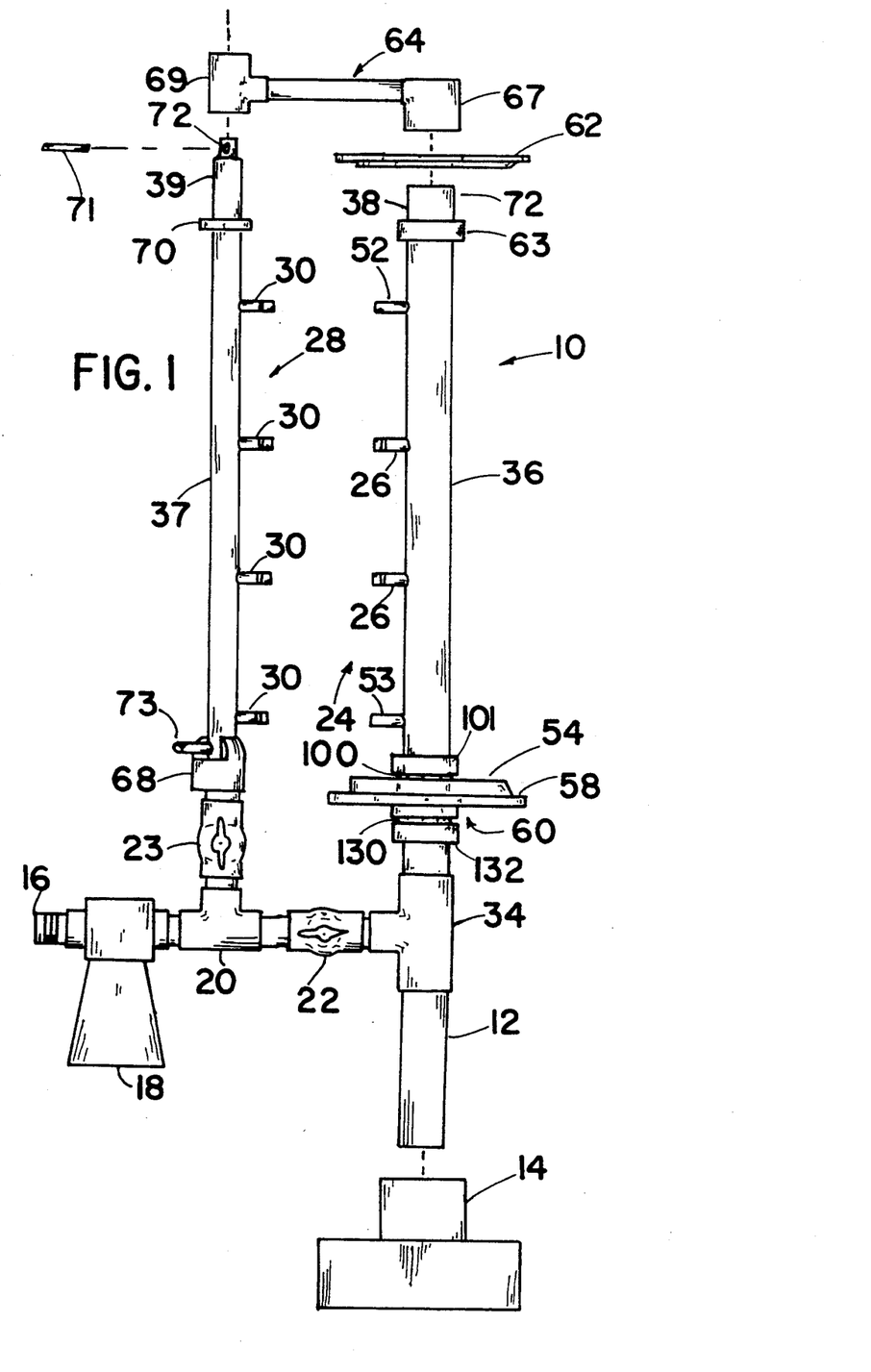
FIG. 1 of the drawing is a partially exploded side elevational view of a preferred embodiment of the apparatus of the invention, FIG. 2 of the drawing is a partially cut away top view of a non-preferred embodiment of the apparatus of the invention showing one nozzle braking the rotation of a filter being washed.

Turning now to FIG. 1 of the drawing, one finds apparatus 10 for spray-cleaning a swimming pool filter that has been removed from its housing. The apparatus 10 is separate from the filter housing, and may be conveniently supported on a support rod 12 removeably inserted into a pole mount 14, tripod, or the like. Pressurized water, commonly supplied through a common garden hose, enters an inlet connection 16 to rotate and spray-clean a filter (not shown in FIG. 1 in the interest of clarity of presentation). The spray-cleaning process may be augmented by adding cleaning agents, such as detergents, bleaches or other oxidizers, disinfectants, etc., from a known cleaning solution dispenser 18 (such as the hose-end sprayer shown in FIG. 1) attached adjacent the inlet connection 16.

When the apparatus 10 is in use, the flow of pressurized water through horizontal pipe 19 may be split at a tee 20, and the two flows separately controlled by valves 22, 23. As seen in FIG. 1, one part of the flow serves a generally axial array 24 of nozzles 26, while the rest of the water flows to a outer array 28 of nozzles 30. Both the central pipe 36 that supplies the axial array 24, and the outer pipe 37 are capped or otherwise closed to fluid flow at their upper ends 38, 39. The support rod 12 may be conveniently attached to the apparatus 10 at a second tee 34 at the base of the axial pipe 36.

Nozzles 26 are preferably made of brass and may be screwed into or adhesively bonded to the central pipe 36, which may conveniently be made of polyvinyl chloride. Since the filter element is subject to being torn if it hangs up on a nozzle while being placed on or removed from the apparatus 10, it is preferred to provide smooth outer ends on the nozzles 26 (e.g., by using a design in which the wrench facets 40 are located at the base of the nozzles, adjacent the pipe 36).

The axial nozzles 26 are designed to provide overlapping sprays 42 that cover the entire inner surface of the cylindrical filter element. The sprays 42 leave some of the nozzles 26 with a component of flow that is tangentially directed against the inner surface 44 of the filter element 46—i.e., a component that is non-radial with respect to the central pipe 36, which serves as axis of rotation for the filter element. This tangentially directed spray component acts to rotate the filter element and thereby to expose the entire inner surface thereof to the cleansing spray. Additionally, dirt on the outer surface 48 of the filter element may be flung off that surface by centrifugal forces if the rotational speed is high enough.

The rate of rotation of the filter 46 can be controlled by regulating the flow rate with the inlet valve 22—i.e., by raising the rotational speed with the intensity of the spray. However, it is often desired to have a relatively intense spray impinging on a slowly rotating filter. A means of controlling the rate of rotation in the present invention may be provided by reorienting one or more of the nozzles 26 so that some (e.g., two of four) nozzles 49 in the axial array 24 act to rotate the filter 46 in one sense (as indicated by the arrow 50 in FIG. 2), while a braking nozzle 52 provides a spray 42 with an oppositely directed component of fluid flow.

The lowest nozzle 53 in the array 24 is usually set to spray in a radial direction and is not used to rotate the filter 46. Dirt washed off the surfaces of the filter 46 flows downward and collects at the bottom of the filter, so the lowest nozzle 53 in the array 24 is set to maximize washing effectiveness—i.e., aimed radially—rather than being used for rotation.

In the preferred apparatus 10, a bearing-supported disk-shaped platform or base 54 is journaled for rotation about the axial pipe 36. The size of the base 54 is selected so that a rubber end disk 56 of the filter 46 will stand on it. The base 54 may be preferably provided with a lip 58 that fits within a specific filter and assists in retaining the filter in the apparatus. Since dirty water from the cleaning operation flows downward and over the base 54, the design of the sealed bearing assembly 60 that supports the platform 54 is an important part of the apparatus, as will subsequently be made clear in discussion of FIG. 4 of the drawing.

A second disk-shaped retainer disk 62 is preferably provided to retain the top of the filter element 46 adjacent the capped end 38 of the central pipe 36. The top retainer 62, like the bottom retainer 54, is journaled for rotation about the central pipe 36. Since the top retainer 62 does not support the weight of the wet filter 46, it has been found that a simple flat-topped PVC collar 63 attached near the upper end 38 of the axial pipe 36 provides an adequate fixed bearing surface. Both retainers may conveniently be made from a transparent plastic material (e.g., polymethyl methacrylate), which allows the operator to inspect the inside surface 44 of the filter 46 during cleaning. Holes 66 in the top retainer 62 can provide additional aid in inspection.

In the preferred embodiment of the invention, a cross-arm support assembly 64 is provided to mechanically link the upper end 38 of the central pipe 36 with the top 39 of the outer pipe 37. The cross-arm support 64 is preferably designed to be swung away from the axial pipe 36 (as indicated by the exploded view of FIG. 1) so that a filter 46 can be placed on or removed from the apparatus 10. An elbow 67 can serve to link the cross-arm assembly 64 to the inner pipe 36 and to hold the top retainer 62 in position. The outer end of the cross-arm assembly 64 can be made from a plumbing tee 69 that slides over the upper end 39 of the outer pipe 37 and stops at a collar 70. A pin 71 or other fastener can be inserted into a hole 72 in the capped end 39 so as to keep the cross-arm 64 captive, while allowing it to be pivoted about the outer pipe 37.

Figure 3:
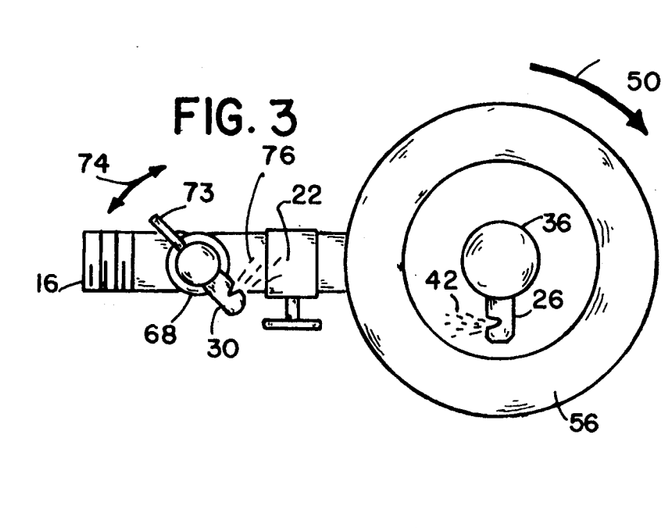
FIG. 3 of the drawing is a top view of the apparatus of FIG. 1 from which the exploded elements at the top of FIG. 1 have been removed and on which a filter cartridge has been placed.

The outer pipe 37, which is used in a preferred embodiment of the invention, may be mounted in a gland 68 that allows it to be oscillated about its own axis. A handle 73 may be fastened to the outer pipe 37 at the gland 68 to facilitate and limit this oscillation. Oscillating the outer pipe, as indicated with the double-ended arrow 74 in FIG. 3 of the drawing, controllably changes the angle of contact between the spray 76 and the outer surface 48 of the filter 46 being cleaned and correspondingly controls the speed of rotation of the filter 46 about the axial pipe 36. As is the case with the axial nozzles 26, the outer nozzles 30 also preferably have smooth outer ends to minimize the incidence of filter tearing. Moreover, the outer nozzles 30 are set to provide a pattern of overlapping sprays 76 that covers the entire outer surface 48 of the filter 46.

If the apparatus 10 incorporates an outer array 28, then the nozzles 26, 30 of the two arrays 24, 28 are preferentially set up in vertical lines along the axial 36 and outer 37 pipes. In this configuration, a radial component of flow velocity of the spray 42 from the co-linear array 24 of nozzles 26 is opposed by a corresponding component of the spray 76 that is radially directed toward the axial pipe 36. Thus, an axially oriented strip of the filter 46 being cleaned is backwashed by the axial array 24 at the same time that dirt is washed off the upstream side of the filter 46 by the outer array 28.

Figure 2:
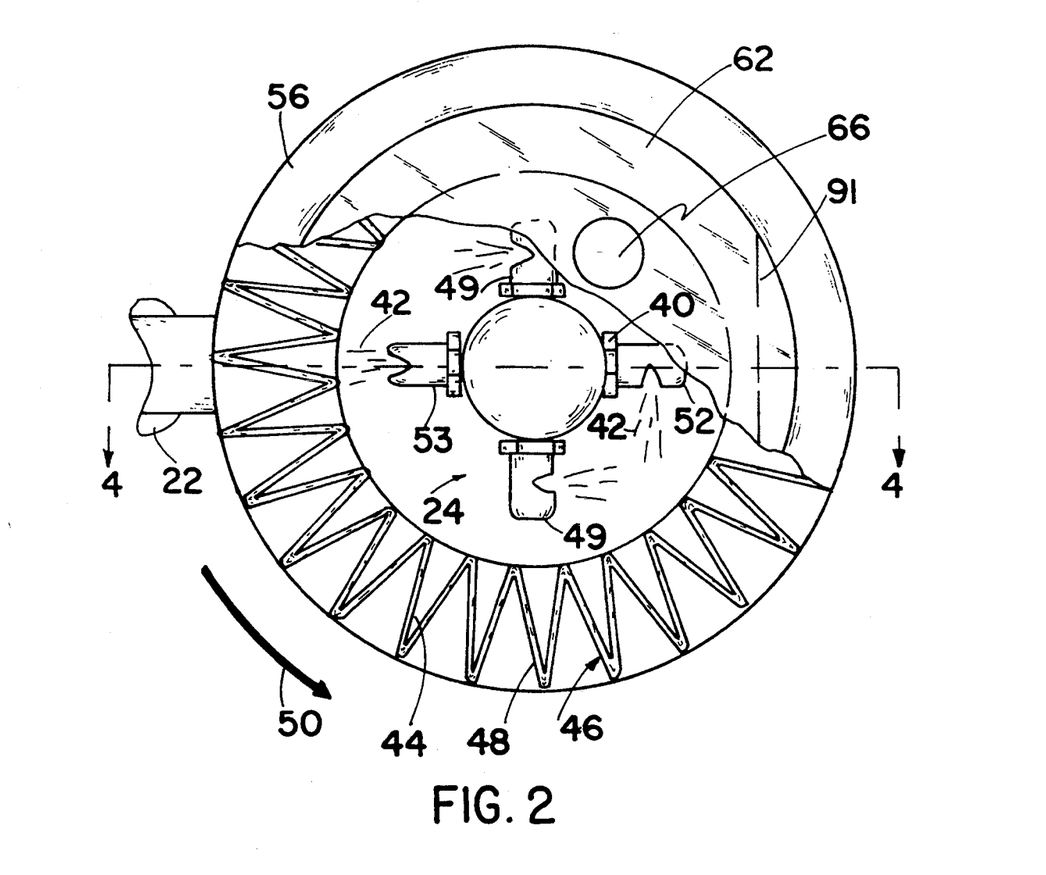

If, on the other hand, one employs a non-preferred filter washing apparatus that does not incorporate an outer array 28, the nozzles 26 of the axial array 24 may be arranged in a non-collinear, or staggered, array as shown in FIG. 2 of the drawing.

Figure 4:
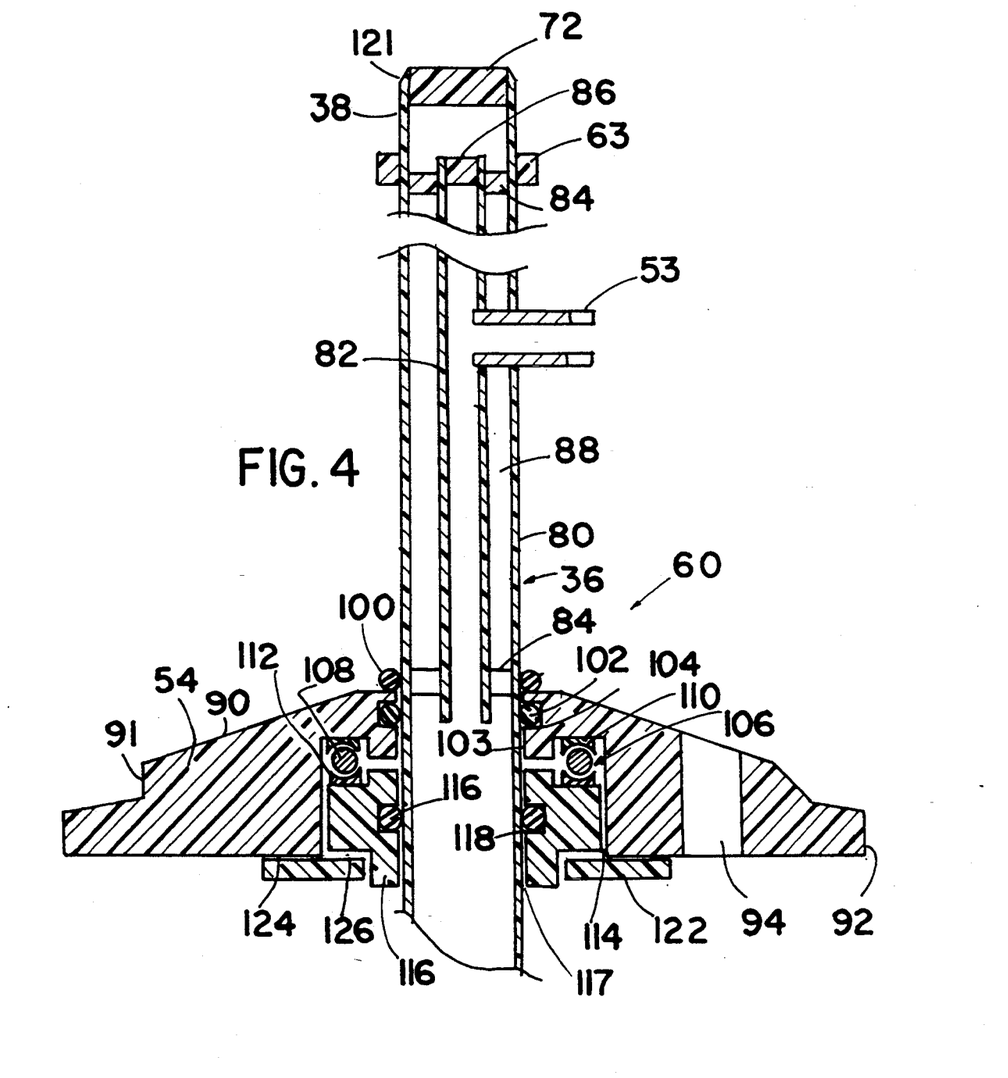
FIG. 4 of the drawing is a cross-sectional view of portions of the axial pipe, the lower rotating platform, and its support bearing assembly.

Turning now to FIG. 4 of the drawing, one finds a vertical cross-section of the axial pipe 36 showing its preferred compound structure that provides both the required mechanical strength and a desirably high operating pressure. The axial pipe 36 consists of an exterior tubular member 80 (commonly one inch PVC pipe) that is strong enough to support the filter 46, and a coaxial inner tubular member 82 that is attached to the exterior portion 80 with a plurality of solvent-welded collars 84. The inner tubular portion 82 of the axial pipe 36 is chosen to be of the same nominal size (e.g., one half inch PVC pipe) as the outer pipe 37, so that the nozzles 26, 30 of both arrays 24, 28 are subject to the same pressures and flow rats. As seen in FIG. 4, a nozzle 53 is inserted through aligned holes in both tubes 80, 82 and is screwed or adhesively bonded to the water-carrying interior tube 82. The water-carrying inner tube 82 is plugged with a cap 86 at its upper end. The combination of the plug 86 and the collars 84 keep the intramural lumen 88 between the two tubes 80, 82 from being connected to the supply of pressurized water.

FIG. 4 of the drawing also illustrates the design of the bearing assembly 60 that is instrumental in supporting the rotating platform 54. The platform 54 has an upper surface 90 that may be comprised of several annular segments (which may include a locking flat 91 corresponding to the shape of the rubber end disk 56 on some filters 46), but that slopes downward from the axial pipe 36 to the outer edge 92 of the platform 54 so as to aid in draining water outward and away from the bearing assembly 60. Additionally, a plurality of drain holes 94 are provided in the platform 54 for this purpose. A slinger O-ring 100, that fits around the axial pipe 36 on the top surface 90 of the platform 54, provides an additional means of excluding water and dirt from the rest of the bearing assembly 60. The size of the slinger O-ring 100 is chosen so that it fits tightly to the exterior tube 80 and does not rotate with the platform 54. In some embodiments of the invention (e.g., FIG. 1) the slinger 100 is held in place with a slinger retaining collar 101 placed around the axial pipe 36.

A sealing O-ring 102 around the axial pipe 36 is disposed in a cavity 104 opening to an axial throughhole 103 in the platform 54. The sealing O-ring rotates with the platform 54, and provides the principal seal against dirt that would otherwise get into and degrade the performance of the ball bearing 106, which preferably uses stainless steel balls 108 running in polytetrafluoroethylene, nylon, polymethylmethacrylate or other non-corrodible races 110, 112. The ball bearing 106 is located in a recess 114 in the rotating platform 54 that is open to the bottom surface 124 of the rotating platform.

The upper bearing race 110 either abuts the platform 54 (as shown in FIG. 4), or is formed integrally into a plastic platform 54. Correspondingly, the lower bearing race 112 either abuts a locking plug 116 (as shown in FIG. 4), or is formed integrally with a plastic locking plug 116. A locking O-ring 118 is seated in, and protrudes from, a cavity 120 that opens to a throughhole 117 in the locking plug 116. Since the two throughholes 103, 117 are coaxial, the locking O-ring 118 can surround the bear tightly on the exterior surface of the outer pipe 80 and can thereby hold the locking plug stationary with respect to the pipe 36 (the provision of a tapered portion 121 at the top end 38 of the axial pipe 36 aids in the initial insertion of the pipe 36 through the bearing assembly 60) while the platform 54 rotates about the pipe 36. The locking plug 116 is conveniently retained within the recess 114 by an annular retaining disk 122 that may be glued or solvent welded over a portion of its upper surface to the bottom 124 of the platform 54. The combined weights of the platform 54 and the wet filter 46 are adequate to ensure that the platform 54 is supported on the ball bearing 106, and that the locking plug 116 does not touch the portion of the upper surface 126 of the retaining disk 112 that acts to hold the bearing assembly 60 together whenever the apparatus 10 is moved or otherwise turned upside down.

An additional means of sealing the bearing assembly 60 against the intrusion of dirt may optionally be provided by a second slinger O-ring 130 around the axial pipe 36 below the bearing assembly 60. Like the upper slinger 100, the lower slinger 130 may be held in position with a retaining collar 132 that is snugly fit around the pipe 36.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is desired to be secured by Letters Patent is:

1. Apparatus for washing a cylindrical filter with pressurized water, said filter having an open top end, an open bottom end, an inner surface, and an outer surface, said apparatus comprising, an inlet connection attached to a supply of said pressurized water, a horizontal pipe extending between and connected to said inlet connection and to a vertical pipe comprising an inner, water-carrying, tubular member and a coaxial outer, filter-supporting, tubular member, said vertical pipe having an upper end and a lower end, said inner tubular member capped adjacent said upper end of said vertical pipe, said inner tubular attached adjacent said lower end of said vertical pipe to said horizontal pipe, said vertical pipe attached adjacent said lower end thereof to a single support rod supporting said apparatus, a platform supporting said bottom end of said filter, said platform rotatably mounted to said outer tubular member of said vertical pipe adjacent said lower end thereof, a retainer fitting said top end of said filter, said retainer fitting over said upper end of said vertical pipe, and freely rotating thereabout, and a plurality of nozzles extending outward of said inner and said outer tubular members of said vertical pipe, each said nozzles spraying said water onto said inner surface of said filter, a first and a second spray respectively from a first and a second of said plurality of nozzles rotating said filter in a first rotational direction about said vertical pipe, a third spray from a third nozzle of said plurality of nozzles opposing said rotation.

2. Apparatus of claim 1 further comprising a second plurality of nozzles disposed on a second vertical pipe having an upper and a lower end, said second vertical pipe outside said filter, said second vertical pipe attached adjacent said lower end thereof to said horizontal pipe.

3. Apparatus of claim 2 wherein said second vertical pipe includes means to oscillate about its longitudinal axis whereby said water, spraying from said second plurality of nozzles, rotates said filter about said first vertical pipe.

4. Apparatus of claim 2 further comprising a cross-arm pivotally attached adjacent said upper end of said second vertical pipe, said cross-arm pivotable between a first position in which said cross-arm links said upper end of said second vertical pipe with said upper end of said first vertical pipe and a second position in which said cross-arm is swung away from said upper end of said first vertical pipe whereby said filter may be placed over said first vertical pipe.

5. Apparatus for washing a cylindrical filter element having an open top end, an open bottom end, an inner surface and an outer surface, said apparatus comprising,
an inlet connection attached to a supply of pressurized water,
a horizontal pipe extending between and connected to said inlet connection and to a lower end of a first vertical pipe, said first vertical pipe closed to fluid flow at an upper end thereof,
a platform supporting said bottom end of said filter, said platform rotatably mounted about said first vertical pipe adjacent said lower end thereof,
a retainer fitting said top end of said filter, said retainer fitting over said upper end of said first vertical pipe and rotating freely thereabout,
a first plurality of nozzles extending outward of said first vertical pipe, said first plurality of nozzles spraying said water on said inner surface of said filter,
a second vertical pipe outside said filter, said second vertical pipe having a top end and a bottom end, said second vertical pipe attached adjacent said bottom end thereof to said horizontal pipe,
a second plurality of nozzles disposed on said second vertical pipe, said second plurality of nozzles spraying said water on said outer surface of said filter, and
a cross-arm pivotably mounted adjacent said top of said second vertical pipe, said cross-arm pivotable between a first position in which said cross-arm links said top of said first vertical pipe and said top of said second vertical pipe and a second position wherein said filter may be placed over said first vertical pipe.

6. Apparatus of claim 5 wherein said second vertical pipe includes means to oscillate about its longitudinal axis whereby said spray from said second plurality of nozzles impinges on said outer surface of said filter with a controllable tangential component of flow and rotates said filter about said first vertical pipe at a controlled rate.

7. Apparatus of claim 5 wherein a first component of fluid flow from first and second tangentially oriented nozzles of said first plurality of nozzles rotates said filter about said first vertical pipe in a first rotational direction, and wherein a second component of fluid flow from a third tangentially oriented nozzle of said first plurality of nozzles is oppositely directed.

8. Apparatus of claim 5 wherein said first vertical pipe comprises an inner, water-carrying, tubular member and a coaxial outer tubular member.

9. Apparatus for washing a cylindrical filter element having an open top end, an open bottom end, an inner surface, and an outer surface, said apparatus comprising,
a vertical pipe having an upper end and a lower end, said vertical pipe capped at said upper end thereof, said vertical pipe attached at said lower end thereof to a horizontal pipe, said horizontal pipe connected to a supply of pressurized water,
a plurality of nozzles extending outward of said vertical pipe, each said nozzle spraying said inner surface of said filter,
a platform supporting said bottom end of said filter, said platform rotatably mounted about said vertical pipe by a bearing assembly comprising a sealing O-ring around said vertical pipe, said sealing O-ring disposed bearing assembly further comprising a ball bearing mounted in a recess opening to a bottom surface of said platform, said bearing assembly further comprising a locking plug mounted in said recess and comprising a second axial throughhole coaxial with said first axial throughhole in said platform, said locking plug abutting said ball bearing, said locking plug comprising a second cavity opening to said second axial throughhole, a locking O-ring disposed in said second cavity, said locking O-ring bearing on an exterior surface of said vertical pipe and locking said locking plug against rotation about said vertical pipe,
an annular retaining disk rigidly affixed to said bottom surface of said platform, said disk retaining said locking plug within said platform, and
a retainer fitting said top end of said filter, said retainer fitting over said upper end of said vertical pipe and rotating freely thereabout.

10. Apparatus of claim 9 further comprising a second plurality of nozzles disposed on a second vertical pipe having an upper and a lower end, said second vertical pipe outside said filter, said second vertical pipe attached adjacent said lower end thereof to said horizontal pipe.

11. Apparatus of claim 9 wherein said pressurized water sprayed from first and second tangentially oriented nozzles of said first plurality of nozzles rotate said filter about said first vertical pipe in a first rotational direction, and wherein a third spray from a third tangentially oriented nozzle of said first plurality of nozzles brakes said rotation.

12. Apparatus of claim 9 further comprising a third O-ring around said vertical pipe, said third O-ring above and adjacent a top surface of said platform.

* * * * *

UNITED STATES PATENT AND TRADEMARK OFFICE
CERTIFICATE OF CORRECTION

PATENT NO. : 5,384,045
DATED : Jan. 24, 1995
INVENTOR(S) : Chmielewski et al.

It is certified that error appears in the above-indentified patent and that said Letters Patent is hereby corrected as shown below:

Col. 6, line 58, member should be inserted after "lar".
Col. 7, line 3, nozzles should read "nozzle".

COl. 8, line 59, rotate should read --rotates--.

Signed and Sealed this

Twenty-third Day of May, 1995

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,384,045
DATED : Jan. 24, 1995
INVENTOR(S) : Chmielewski et al.

It is certified that error appears in the above-indentified patent and that said Letters Patent is hereby corrected as shown below:

Col. 8, line 31, insert: -- in a first cavity in said platform, said first cavity opening to a first axial throughhole formed in said platform, said -- should be between " ring disposed" and " bearing assembly".

Signed and Sealed this

Eighteenth Day of July, 1995

Attest:

BRUCE LEHMAN

Attesting Officer     Commissioner of Patents and Trademarks